UNITED STATES PATENT OFFICE.

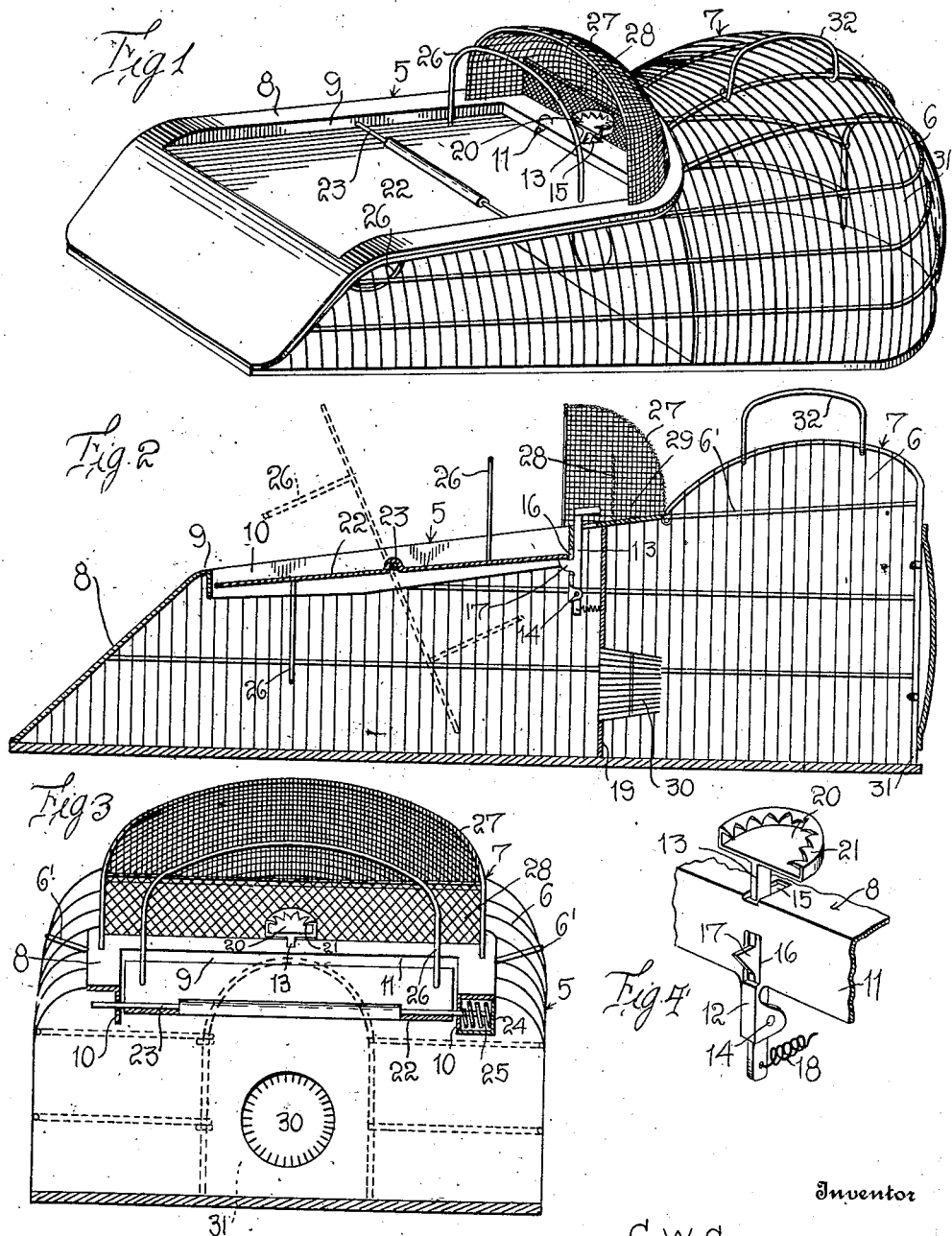

CHARLES W. STOCKBURGER, OF ALLEN, TEXAS.

ANIMAL-TRAP.

1,230,535.  Specification of Letters Patent.  Patented June 19, 1917.

Application filed March 31, 1917.  Serial No. 158,949.

*To all whom it may concern:*

Be it known that I, CHARLES W. STOCKBURGER, a citizen of the United States, residing at Allen, in the county of Collin and State of Texas, have invented certain new and useful Improvements in Animal-Traps, of which the following is a specification, reference being had to the accompanying drawings.

This invention relates to animal traps and more particularly to a simply constructed, as well as durable and efficient mouse or rat trap.

It is another object of my invention to provide a trap of the above character having a spring-actuated movable trap plate, a trigger for supporting the plate against movement under the action of a spring and release the animal, means on the plate to prevent the escape of the animal and positively projected into the trap when the plate is released.

It is also an important object of the invention to provide an improved construction of the trap body and a mounting and arrangement of the bait supporting trigger, whereby the actuation of said trigger and the release of the trap plate is positively assured when the attempt is made by the animal to remove the bait.

And it is also a further general object of my invention to improve and simplify the construction of traps of the above character, whereby the same are rendered serviceable and reliable in practical use and capable of manufacture at small cost.

With the above and other objects in view, my invention consists in the novel features of construction, combination, and arrangement of parts to be hereinafter more fully described, claimed and illustrated in the accompanying drawing, in which, Figure 1 is a perspective view illustrating a mouse or rat trap constructed in accordance with the preferred embodiment of my invention;

Fig. 2 is a longitudinal section through the trap, the trap plate being shown in dotted lines in intermediate position;

Fig. 3 is a transverse section; and

Fig. 4 is a detail perspective view of the pivoted trigger member and bait support.

Referring in detail to the drawing, 5 designates the body of the trap which is preferably constructed of spaced, transversely curved wires 6 connected by a series of relatively heavy, longitudinally extending wires 6'. This trap body has a flat base portion and an enlarged or bulbous end portion indicated at 7. The top portion of the body is longitudinally inclined from said end 7 to the latter end of the trap. A metal plate 8 is arranged in the top portion of the trap body and extends from its relatively narrow, shallow end to a point substantially midway between the opposite ends of the top portion of said body. The edges of this plate are soldered or otherwise securely fixed to the transverse and longitudinal wires 6 and 6'. The plate 8 has an elongated, rectangular opening 9 therein and flanges 10 projecting outwardly from its opposite longitudinal edges. A flange 11 also projects downwardly from the inner end edge of this opening and is centrally formed with a projecting U-shaped arm 12 affording spaced ears between which the trigger bar 13 is pivotally mounted at its lower end, as indicated at 14. The upper end of this bar extends through an opening 15 in the plate 8, and the flange 11 has an opening 16 formed therein through which a lug or detent 17 on the bar 13 projects. A coil spring 18 is attached at one of its ends to the lower end of the trigger bar 13 and has its other end attached to a transverse partition wall 19 which divides the trap body at its approximate center into two compartments. Upon the upper end of the trigger bar 13, the bait cup 20 is suitably secured, the upstanding marginal wall of this cup having inwardly and downwardly turned teeth or spurs 21 thereon to bite into the bait and hold the same in the cup to prevent the removal of the bait by the animal.

22 designates the trap plate to which a transverse rod or shaft 23 is suitably fixed. The ends of this shaft are rotatably supported in the longitudinal flanges 10. A housing 24 incloses one of the projecting ends of the shaft 23 and is secured to the under side of the wall 8. A coil spring 25 is arranged within this housing and has one of its ends attached to the shaft 23 and its other end secured to the housing wall.

To each end of the trap plate and on relatively opposite sides thereof, the extremities of the transversely extending, upwardly curved or bowed wire rods 26 are fixed, the purpose of which will presently appear.

A wall of wire mesh or other suitable reticulated material 27 is fixed upon the upper face of the plate 8 and extends over the bait cup 21. This covering is open on the side adjacent to the trap plate 22 and a vertical division wall also of reticulated material, shown at 28, extends between the opposite sides of the cover 27. Food stuff or any other suitable lure may be placed in the compartment 29 back of this division wall 28, the bait being secured in the cup 21 by the teeth 20, as will be readily understood.

In the division wall 19 of the trap body adjacent its lower end, the funnel-shaped entrance 30 to the larger end portion of the trap body is secured, and this larger end of the trap body has an outlet opening closed by a hinged cover 31 which is provided with a suitable latch. A handle 32 is connected to the top of the trap at its larger end, whereby the trap may be conveniently moved from place to place.

In the operation of the device as above described, the trap is set by first disengaging the trigger lug 27 from the trap plate 22 and rotating said trap plate to wind or tension the spring 25. This spring in unwinding tends to rotate the trap plate and force one end thereof downwardly upon the lug 17. This lug being disposed against the under side of said plate prevents such downward movement. The suitable bait having been placed in the cup 20, the animal in approaching the bait inserts its head under the transverse, upwardly curved wire 27, and upon attempting to remove the bait from the cup, forces the cup backwardly and thus disengages the lug 17 from the end of the trap plate. The spring 25 then immediately acts to move said end of the trap plate downwardly and the wire 26 engages upon the back or neck of the animal and violently throws the animal into the trap so that when the opposite end of the plate again comes into contact upon the lug 17, the animal will either be within the narrower end of the trap body or be hung between the wire rod 26 and the under side of the trap plate. The animal seeking an outlet will pass through the funnel-shaped entrance 30 into the larger end portion of the trap body and the trap is again set in position in condition for the next animal. The spring 25 may, of course, be made of any desired size so that it will serve to operate the trap plate the requisite number of times before it entirely loses its tension.

From the foregoing description, taken in connection with the accompanying drawing, the construction, manner of operation, and several advantages of the invention will be fully understood. The trap may, of course, be made in various sizes and the body portion thereof can be otherwise constructed than as herein referred to. I have found my improved trap to be positive and reliable in its operation. The rats or other animals are attracted to the bait by the lure contained in the compartment 29, and as the bait is secured or held within the cup by the teeth 21, it cannot be removed without releasing the trap plate. The device as a whole is also of relatively simple construction, not liable to get out of order, and may be manufactured at relatively small cost.

While I have shown and described the preferred construction and arrangement of the several parts of the device, it is to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. In an animal trap, a trap body, a rotatable trap plate mounted in the top wall of said body, an animal released trigger member supporting said plate against rotation, and means on the trap plate adapted to strike the animal and project the same into the trap when said plate is released.

2. A trap of the character described including a body, a rotatable trap plate mounted in the top wall of said body, a spring to rotate in said plate, a pivoted trigger bar having a lug to engage beneath one end of the plate and prevent rotation thereof under the action of the spring, bait securing means on the trigger bar, and transversely disposed rods fixed upon the ends of the plate on relatively opposite sides thereof and adapted to strike the animal and project the same into the trap when the trap plate is released.

In testimony whereof I hereunto affix my signature in the presence of two witnesses.

CHARLES W. STOCKBURGER.

Witnesses:
N. P. LEWIS,
W. D. ROBBINS.